United States Patent [19]

Gerson et al.

[11] Patent Number: 4,918,732
[45] Date of Patent: Apr. 17, 1990

[54] FRAME COMPARISON METHOD FOR WORD RECOGNITION IN HIGH NOISE ENVIRONMENTS

[75] Inventors: Ira A. Gerson, Hoffman Estates; Brett L. Lindsley, Schaumburg, both of Ill.

[73] Assignee: Motorola, Inc., Schaumburg, Ill.

[21] Appl. No.: 357,688

[22] Filed: May 25, 1989

Related U.S. Application Data

[62] Division of Ser. No. 816,598, Jan. 6, 1986, abandoned.

[51] Int. Cl.$^4$ .............................................. G10L 7/08
[52] U.S. Cl. ........................................ 381/43; 381/46
[58] Field of Search ................................ 381/41–47, 381/36–40, 71, 94; 364/513.5

[56] References Cited

U.S. PATENT DOCUMENTS

| | | | |
|---|---|---|---|
| 3,403,224 | 9/1968 | Schroeder | 381/47 |
| 3,816,722 | 6/1974 | Sakoe et al. | 381/43 |
| 4,052,568 | 10/1977 | Jankowski | 381/46 |
| 4,158,750 | 6/1979 | Sakoe et al. | 381/43 |
| 4,239,936 | 12/1980 | Sakoe | 381/43 |
| 4,597,098 | 6/1986 | Moso et al. | 381/46 |
| 4,601,054 | 7/1986 | Watari et al. | 381/43 |
| 4,624,011 | 11/1986 | Watanabe et al. | 381/43 |
| 4,628,529 | 12/1986 | Borth et al. | 381/94 |
| 4,720,802 | 1/1988 | Damoulakis et al. | 381/43 |

FOREIGN PATENT DOCUMENTS 2137791  10/1984  United Kingdom .

OTHER PUBLICATIONS

"An Algorithm for Determining the Endpoints of Isolated Utterances" by L. R. Rabiner and M. R. Sambur, *Bell System Technical Journal*, vol. 62, No. 5, May–Jun. 1983.

"FIR Digital Filter Banks for Speech Analysis" by R. W. Shafer and L. R. Rabiner and O. Herrmann, *Bell System Technical Journal*, vol. 54, No. 3. pp. 531–544, Mar. 1975.

"Speech Enhancement Using a Soft-Decision Suppression Filter" by Robert J. McAulay and Marilyn L. Malpass, *IEEE Transactions* on Acoustics, Speech, and Signal Processing, vol. ASSP-28, No. 2, pp. 137–145, Apr. 1980.

"An Algorithm for Connected Word Recognition" by Bridle, Brown and Chamberlain, Proceedings of the 1982 *IEEE International Conference on Acoustics, Speech and Signal Processing*, pp. 899–902.

"The Viterbi Algorithm", by G. D. Forney, Jr., *IEEE Proceedings on Acoustics, Speech and Signal Processing*, vol. 61, No. 3, Mar. 1973.

"A Real-Time hardware Continuous Speech Recognition System", by J. B. Peckham, I. R. D. Green, J. V. Canning and P. Stephens, *Proceedings 1982 IEEE Int. Conference on Acoustics, Speech and Signal Processing*, pp. 863–866.

"A Digital Filter Bank for Spectral Matching" by Dennis H. Klatt, Massachusetts Institute of Technology pp. 573–578.

"The Effects of Selected Signal Processing Techniques on the Performance of a Filter-Bank-Based Isolated Word Recognizer", by Dautrich, Rabiner, and Martin, *Bell System Technical Journal* vol. 62, No. 5, May–Jun. 1983, pp. 1311–1337.

"On the Use of Energy in LPC-Based Recognition of Isolated Words", by M. K. Brown and L. R. Rabiner, *Bell System Technical Journal* vol. 61, No. 10, Dec. 1982, pp. 2971–2987.

*Primary Examiner*—Gary V. Harkcom
*Assistant Examiner*—John A. Merecki
*Attorney, Agent, or Firm*—Raymond A. Jenski; Rolland R. Hackbart

[57] ABSTRACT

A method and arrangement for a speech recognition system employs channel bank information to represent speech. The method considers background noise included with the speech. The method includes determining three energy levels for each channel the first representative of background noise energy, the second representative of the input frame energy and the third representative of the word template frame energy. Values representing energy level differentials are assigned at each channel. If the second energy level is less than the first energy level, then a predetermined constant value is assigned at the particular channel. These values are combined to generate a distance measure depicting the similarity between the two frames.

6 Claims, 5 Drawing Sheets

FRAME COMPARISON METHOD FOR WORD RECOGNITION IN HIGH NOISE ENVIRONMENTS

This is a continuation of application Ser. No. 816,598, filed Jan. 6, 1986, now abandoned.

BACKGROUND OF THE INVENTION

The present invention relates generally to the practice of word recognition in a speech recognition system and, more particularly, to the recognition of words in the presence of high noise.

A long standing problem in speech recognition systems has been the difficulty in effecting acceptable performance in high noise environments. Often speech recognition systems are in an environment where background noise severely degrades the recognition process.

Earlier developments of recognition systems for high noise environments have typically utilized head mounted or hand-held microphones. Such systems have attempted to overcome the problem of background noise by requiring that the microphone be positioned close to the mouth. Although this may be a somewhat effective solution for this type of system, a head mounted or hand-held microphone arrangement is not practical, nor acceptable, for many systems.

The most desirable types of recognition systems are those which operate hands-free. A hands-free system is extremely practical in cases where the operator is required to manually handle controls, such as while driving. Due to high background noise in such an environment, the speech recognition system must be able to accurately distinguish words from the background noise, as well as free the operator from manual control of a microphone. A system of this kind offers substantial improvement to the operator's productivity and concentration.

There have of course been previous attempts to accurately effect a work recognition system in high noise environments. Some approaches subtract an estimate of the background noise from the speech using spectral subtraction and then match the speech to word template memory. Typically, the template memory is segmented into frames of equal time intervals. Likewise, the incoming speech is split into frames before the matching process begins. Each frame from the incoming speech is then compared to frames from the template memory. A match is depicted by a sequence of frames from the incoming speech corresponding to frames of a template in memory. Notwithstanding a particular word template matching technique, spectral subtraction usually requires that an estimate of the background noise be subtracted from the incoming speech before matching to the template.

Some of the more successful recognition systems actually implement the consideration of the background noise into a specific spectral matching technique. However, these systems often require a complex method of comparing frames within word templates to the input frames representing the speech. Adding such complexity has resulted in either a substantially slower recognition process or a restriction to a very specialized, high speed system architecture.

What is needed is a simple method for comparing a wood template frame to an input frame which compensates for the presence of background noise. Such a method should be computationally fast and should not require specialized hardward architecture.

OBJECTS AND SUMMARY OF THE INVENTION

Accordingly, it is an object of the present invention to provide an improved method for comparing an input frame to a word template frame for a speech recognition system in high noise which results in high recognition accuracy and is computationally efficient.

It is an additional object of the present invention to provide such an improved method which can be used in an unlimited number of word template searching techniques, including truncated search techniques.

The present invention teaches an improved method of matching an input frame to a word template frame for speech recognition in a high noise environment. The method employs the use of spectral channels for representing both the word template frames and the input frames. Specific steps of this method include determining three energy levels for each channel used. The energy levels include a first level representative of background noise energy, a second level representative of the input frame energy and a third level representative of the word template frame energy. Values are assigned at each channel including a constant value when the second level is less than the first level at one or more channels. These values are then used to generate a distance score between the input frame and the word template frame.

BRIEF DESCRIPTION OF THE DRAWINGS

FIG. 5b is a continuation of the flowchart of FIG. 5a.

DETAILED DESCRIPTION OF THE PREFERRED EMBODIMENT

Figure 1:
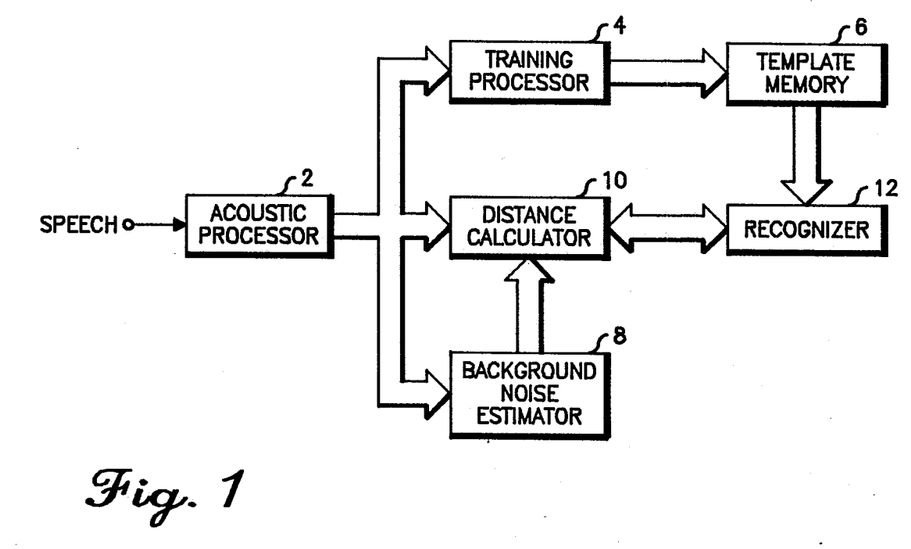
FIG. 1 is a block diagram of a speech recognition system illustrating an arrangement of blocks pertinent to the present invention.

FIG. 1 is a block diagram of a speech recognition system illustrating blocks pertinent to the present invention. Initially, input speech is converted into channel bank information by the acoustic processor 2 for training the system, i.e. establishing a system vocabulary. The acoustic processor converts the speech into filter bank information. One method for generating filter bank information is described by R. W. Shafer, L. R. Rabiner and O. Herrmann in "FIR Digital Filter Banks for Speech Analysis" Bell System Technical Journal, Vol. 54 No. 3 pp 531-544, March 1975.

The training processor 4 detects endpoints from the converted speech and generates work templates for storage in template memory 6. A variety of training processors can be used for this purpose, such as is described by L. R. Rabiner and M. R. Sambur in "An Algorithm for Determining the Endpoints of Isolated Utterances", Bell System Technical Journal, Vol. 54 No. 2, pp 297-315, February 1975.

Once training is completed, the training processor 4 is disabled and the system configures itself for speech recognition. Speech which is processed by the acoustic processor 2, is used by the distance calculator 10 and the background noise estimator 8. The background noise estimator 8 calculates an approximation of noise which is input with the speech. Such an estimator is described in by Robert J. McAulay and Marilyn L. Malpass in a paper entitled "Speech Enhancement Using a Soft-Decision Suppression Filter", IEEE Transactions on Acoustics, Speech, and Signal Processing, Vol. ASSP-28, No. 2, pp. 137-145, April 1980.

The distance calculator 10 employs the converted speech from the acoustic processor 2, the word templates from the template memory 6, and background noise levels from the estimator 8 to generate a measure of similarity, or a distance, between each input frame and frames from the word template. The recognizer 12 provides the distance calculator 10 with the appropriate frames from template memory 6 for comparison. There are a number of well known recognition frameworks that can be used to provide this control, one or which is described by Bridle, Brown and Chamberlain in "An Algorithm for Connected Word Recognition", Proceedings of the 1982 IEEE International Conference on Accoustics, Speech and Signal Processing, pp 899-902. However, the distances calculated by the distance calculator 10 are critical for whichever recognizer is used by the system. Regardless of the manner in which the word templates are controlled or located, if the calculated distances are not accurate, the recognizer cannot identify an accurate match to a word template. Subsequent discussion is directed to frame comparison performed within the distance calculator 10.

Improvements in isolated word searching techniques have recently used silence states in recognition models for matching an input speech utterance, represented as a series of frames, to a word template in a frame-by frame manner. Typically, a speech recognition system will represent speech utterances using feature data such as LPC paramaters, channel bank information or line spectral pairs. A vocabulary is formed by representing the spoken words as word templates. When a frame of input speech is compared to a word template frame, a distance score is generated. For a number of word templates compared to a series of input frames representing an input word, the template with the lowest distance score usually indicates that the input word is matched to that word template.

Figures 2, 3:
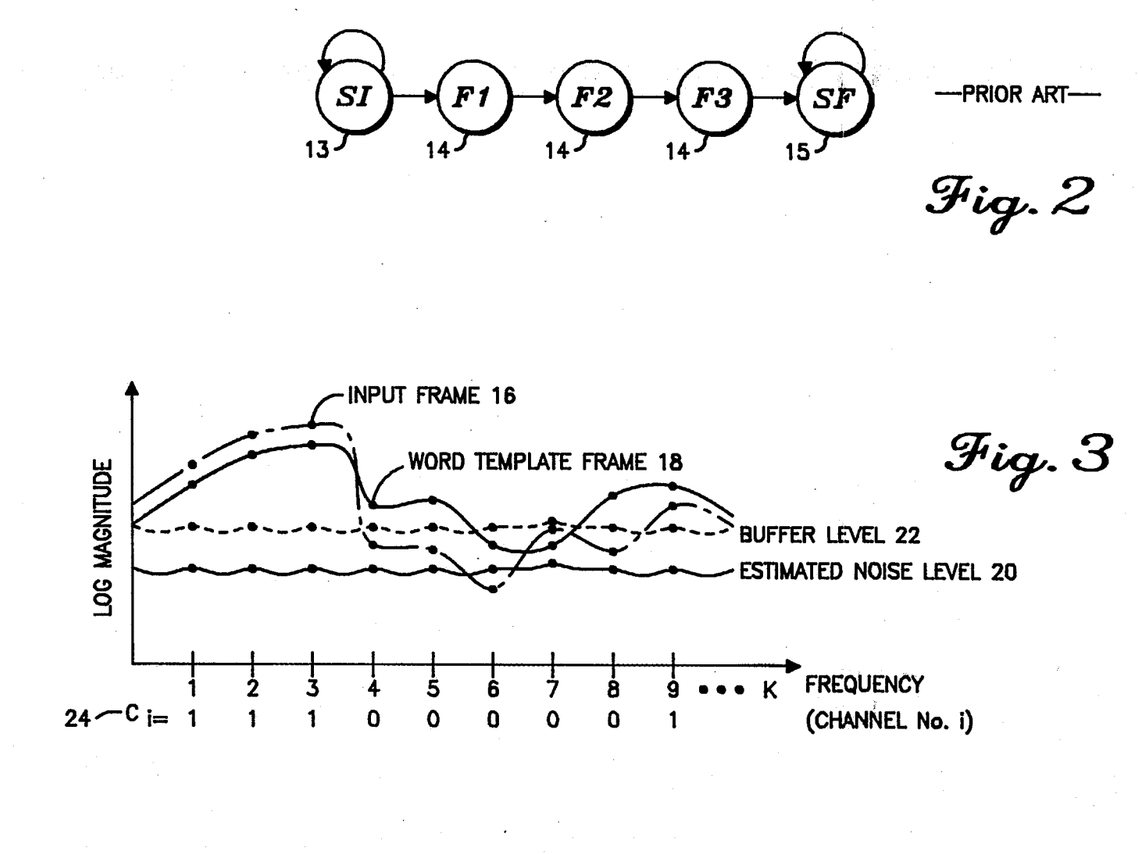
FIG. 2 is an illustration of a prior art state model for a word template used by a speech recognition system.
FIG. 3 is a graph illustrating an example of an input frame being compared to a word template frame, according to the present invention.

Silence states are employed in a typical word searching technique by matching input frames, representative of silence, to silence frames within a word model using a suitable distance measure. FIG. 2 illustrates a word template model with an initial silence state 13 and an editing silence state 15 appended. The inner states 14 represent prestored frames of the actual word template. The use of silence states can greatly increase the performance of a word recognition system operated in a high noise environment. In high noise it is very difficult to accurately determine the endoints of words since the beginning and/or ending of the words may be buried in the noise. The silence states 13 and 15 can help spot the beginning and ending of the spoken word to which the model is being compared. Employing a state sequence estimation method, such as that described by G. D. Forney, Jr. in a paper entitled "The Viterbi Algorithm", *IEEE Proceedings on Acoustics, Speech and Signal Processing,* Vol. 61, No. 3, March 1973, with silence states in a word model can facilitate the decoding process without requiring that the beginning and ending of an input word be known.

FIG. 2 illustrates one model which can be used for a variety of methods for comparing input frames to a word template. However, despite the type of method used, using a frame-by-frame comparison technique requires that a distance score be generated for each pair of frames compared.

Notwithstanding the type of method used, the method must generate a distance score accurate enough for the word template searching technique to distinguish between many potential word templates. When significant levels of background noise exist, levels that often exceed the levels of the speech, this method must still be able to generate a distinguishable distance score.

FIG. 3 is a graph illustrating an example of such a method in accordance with the present invention. In this example each frame contains channel bank information pertaining to energy levels in each of 'k' frequency channels. These channels are seen on the horizontal axis. On the vertical axis, depicted is a relative log magnitude scale. Plotted in the graph are three energy levels 16, 18 and 20 representing an input frame 16, a word template frame 18 and an estimated noise level 20, respectively. A dotted line represents a buffer level 22. The buffer level 22 is determined from the noise floor at a particular channel i plus a constant. Though this constant may vary for different applications, in the present embodiment, it is preferred to be a value representing about 3 dB. At each channel i, the input frame level 16 is compared to the buffer level 22. If the input frame level 16 is greater than the buffer level 22, then an assignment of 1 is made for that channel as shown 24, i.e. $C_i = 1$. $C_i$ 24 is used to determine which input frame channels, if any, are substantially above the noise level 20. "Substantially" refers to the 3 dB buffer.

An energy normalization of the channels, required to change the levels to relatively similar magnitudes, is subsequently discussed. It should be noted, however, that the levels shown in FIG. 3 are meant only to help illustrate the present invention. Actual levels, after energy normalization, would probably differ from those shown.

After normalization, at those channels where the input frame level 16 is above the buffer level 22, i.e. where $C_i = 1$, the input frame level is subtracted from the work template frame level 18. In this example, since $C_i = 1$ only at channels 1,2,3 and 9, there are only four subtractions. The absolute value representing each subtraction is accumulated for a partial distance score.

At those channels where $C_i = 0$, channels 4-8, a value is assigned. This value depends on the difference between the word template frame level 18 and the input frame level 16. If the difference between the word template level 18 and the input frame level 16 is not greater than a preselected nominal differential, then the nominal differential becomes the assigned value for that particular channel. Otherwise, the assigned value is equal to the subtracted difference. This nominal difference is a predetermined constant, used to prevent the partial distance score from accumulating nonrepresentative values. This occurs when input frame levels very close to the noise level 20 are predominantly noise rather than the actual speech itself. A total accumulation of assigned values from every channel is used to form a total distance score. This total distance score represents a measure of acoustic similarity between the input frame and the word template frame. A relatively low total distance score indicates two similarly acoustic frames. A total distance score of zero indicates a perfect match.

By implementing a method in conformance with the example given, efficient computation can be used to determine the similarity between a word template and a series of input frames representing a spoken word.

Figure 4:
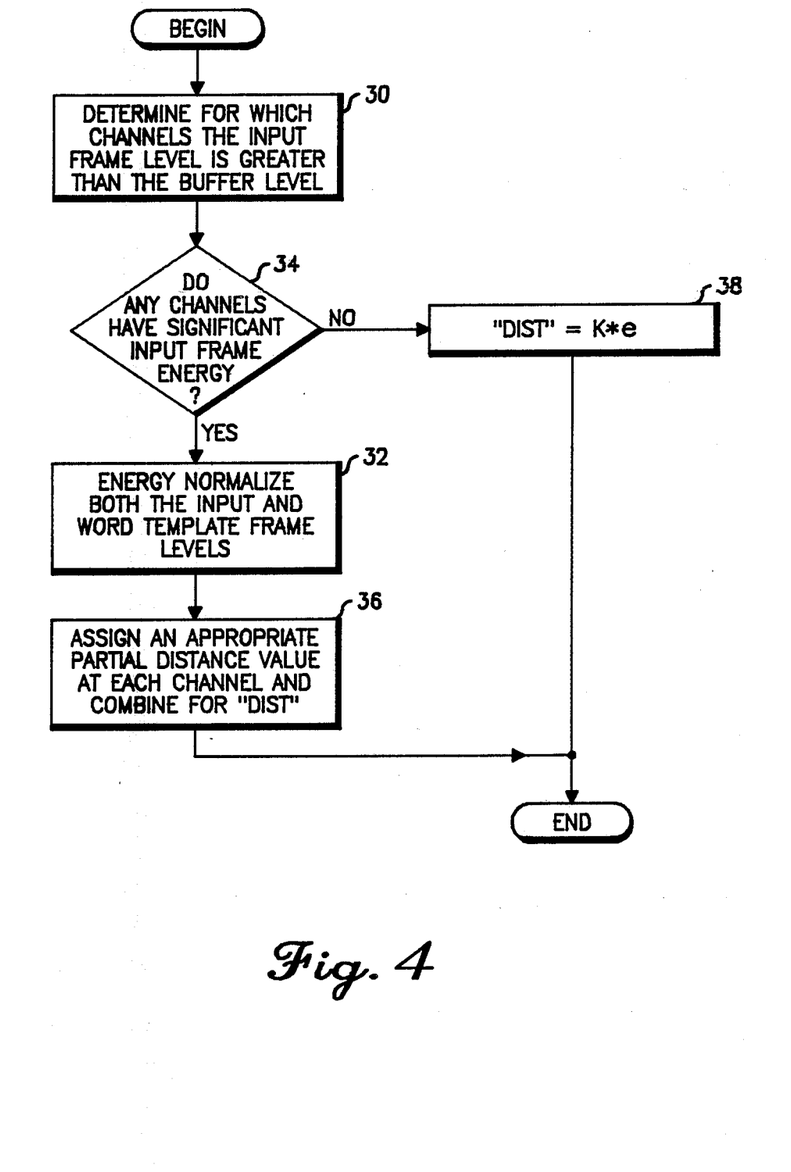
FIG. 4 is a general flowchart, illustrating steps for generating a distance score between an input frame and a word template frame, according to the present invention.

Now referring to FIG. 4, shown is a general flowchart of the frame comparison method illustrated above. The flowchart begins by determining for which channels the input frame has energy significantly above the background noise level, block 30. This is done by subtracting the buffer level from the input frame level and comparing the results to zero. If the difference is positive, then $C_i=1$ and the channel is considered to be significantly above background noise.

At block 34, a test is then performed to determine if $C_i=1$ for any channels. For the test results in the affirmative, a normalization is required for both the input frame and the word template frame energy levels, block 32. Without normalization, if the energy of the word template is much different than the energy of the input frame, the distance between them would indicate very little acoustic similarity. Prior art has typically normalized by subtracting the mean log energy over all the channels in the frame from the log energy at each particular channel. However, this does not work very well when a significant amount of background noise is present. A more representative normalization can be calculated by normalizing each level based on the mean energy levels at only those channels where significant energy in the input frame exists. In the example from FIG. 3, this would be where $C_i=1$.

For example, an input frame energy level, X, and a word template frame energy level, Y, can be normalized over k channels as follows:

Let $C_i=1$ where significant energy exists for the input frame at channel i. Let $C_i=0$ where it does not.

Then for each channel i, $X_i$ is normalized by subtracting $(Sum_{i=1} \text{ to } k \ X_i*C_i)/(Sum_{i=1} \text{ to } k \ C_i)$ and similarly $Y_i$ is normalized by subtracting $(Sum_{i=1} \text{ to } k \ Y_i*C_i)/(Sum_{i=1} \text{ to } k \ C_i)$.

Therefore, the mean energy is determined only from channels having $C_i=1$.

It should be noted that for most recognizers, the determination of active channels ($C_i=1$) and the normalization of the input frame must be performed only once for each input frame, even though several word template frames are typically compared each time a single input frame is processed.

If not channel has significant input frame energy, i.e. $C_i=0$ for all channels, then the value assignment at every channel is the same. This assignment is predetermined, representing the expected differential between the input frame level and the template frame level. Letting this expected differential equal "e", then for k channels, the total distance score can easily be calculated as 'k*e'. This is shown in block 38.

If any channels are active, an appropriate value is assigned which indicates an absolute differential between the normalized input frame level and the normalized word template frame level for that channel. An accumulation of these value assignments determines the total distance score (DIST), block 36. For channels witout significant energy, additional tests are made for determining a proper value assignment. These additional tests and assigned values are discussed in the flowchart of FIGS. 5a and 5b.

Figure 5A:
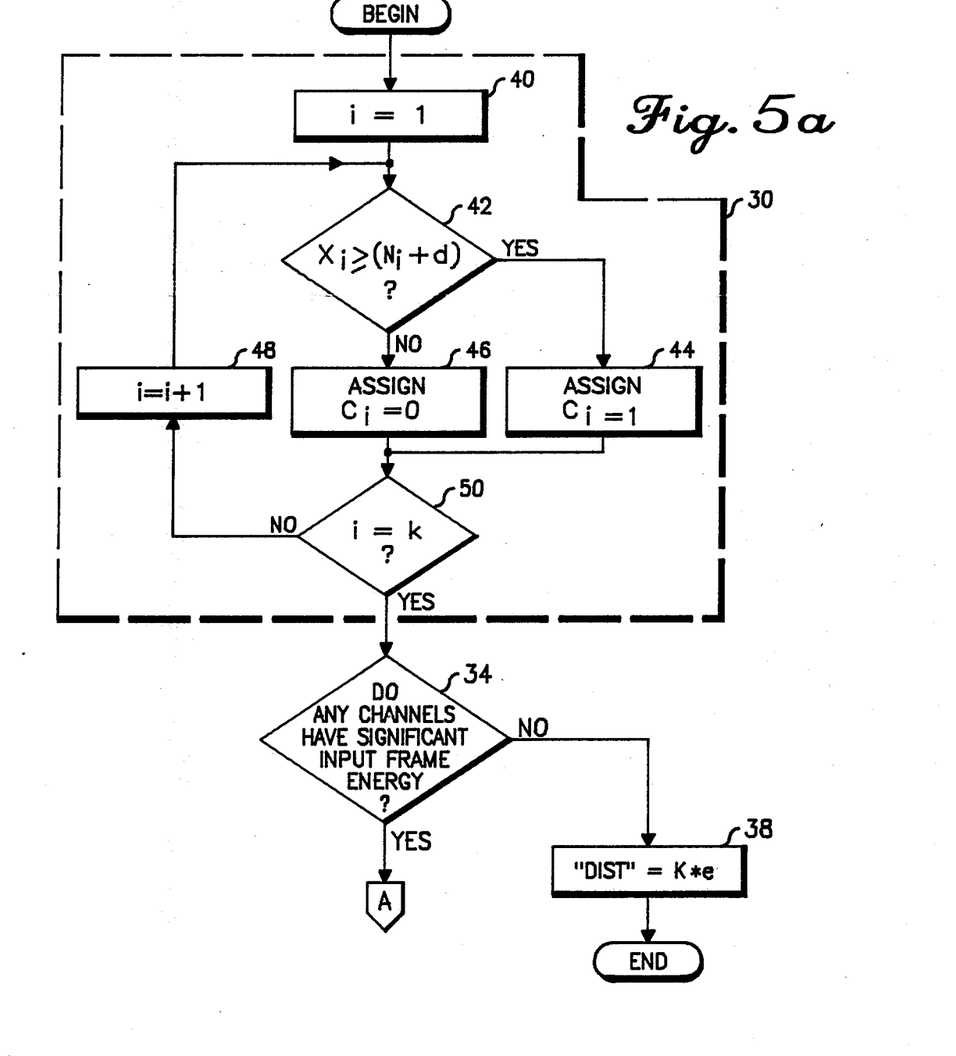
FIG. 5a is an expanded flowchart showing, more specifically, the steps illustrated in FIG. 4.

Now referring to FIG. 5a, shown in the flowchart of FIG. 4 expanded. A definition of each variable used in this expanded flowchart is listed below.

X=input frame levels for each channel
Y=word template frame levels for each channel
N=estimated background noise levels for each channel
k=total number of channels
d=buffer differential over N
e=predetermined expected value for channel distance
C=indicators for significant energy for each channel of the input frame.
i=channel number
T=word template frame channel level minus input frame channel level.
DIST=total distance score Block 30 of FIG. 4 is expanded into blocks 40 through 50 of FIG. 5a. At each channel i, a decision is made, block 42, to determine if the energy level of the input frame X is significantly greater than the estimated background noise level, N. This is done by comparing the buffer level to the input frame level. The buffer level is defined as the noise level plus the buffer differential. If the input frame level is greater than or equal to the buffer level, it is indicated by setting $C_i=1$, block 44. If the input frame level is less than the buffer level, it is indicated by setting $C_i=0$, block 46. The procedures from blocks 42 through 46 are repeated for every channel, as illustrated by blocks 40, 48 and 50.

Block 34 of FIG. 4 requires no further expansion. To determine if the input frame level has significant energy at any channels, a test is made to indicate whether $C_i=1$ at any channel. If $C_i=1$ at least one channel, flow proceeds to block 32. If $C_i=0$ at all channels, then the predetermined total distance score 'k*e' is assigned as the distance measure, block 38.

Figure 5B:
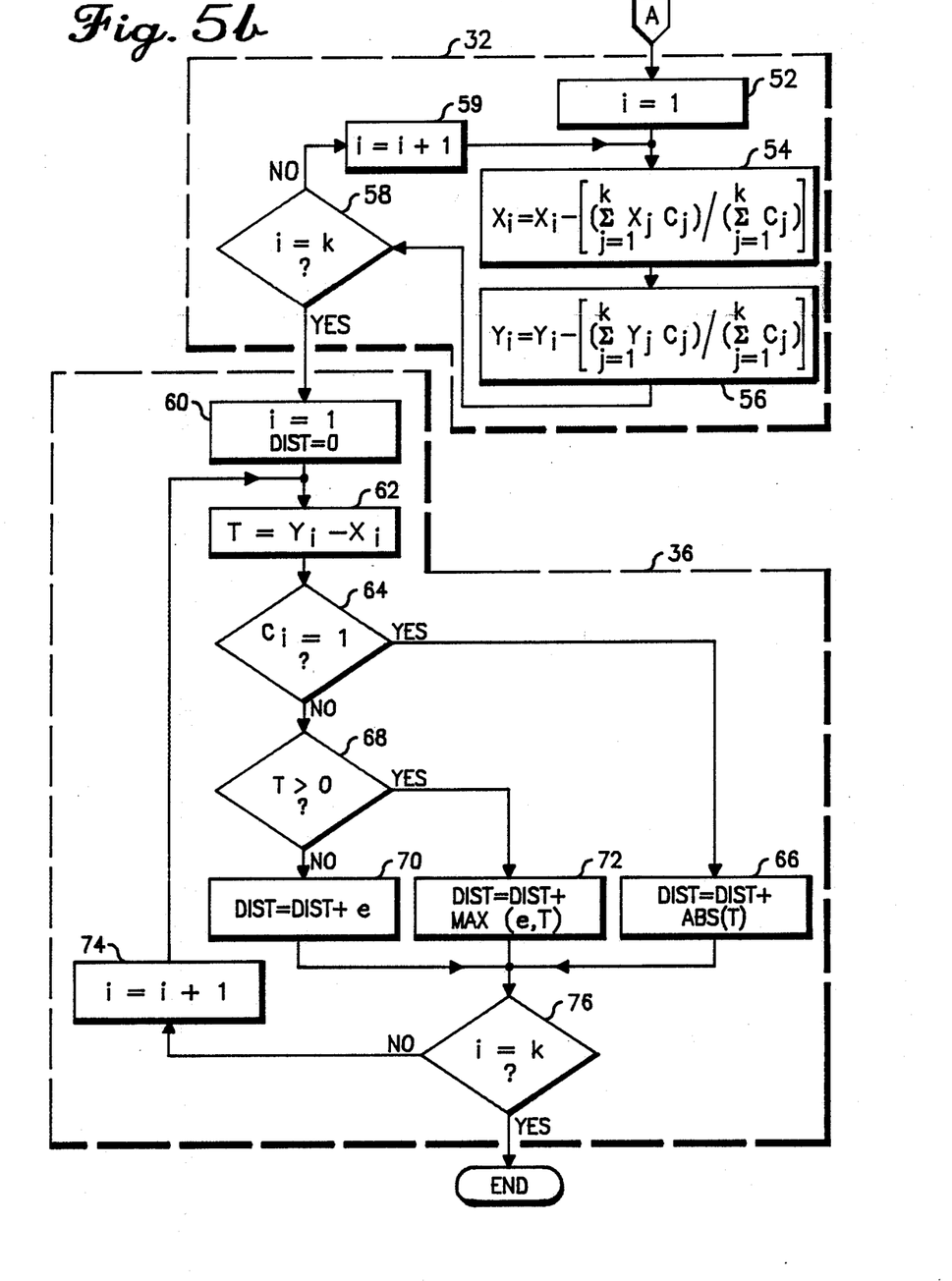

Continuing on to FIG. 5b, block 32 of FIG. 4 is expanded into blocks 52 through 58. At every channel both the input frame level and the word template frame level are normalized to compare spectrally similar waveforms of different energy levels. Blocks 52, 58 and 59 indicate the normalization at each channel. The input frame is normalized at each channel by subtracting its mean level from the input frame level. As previously discussed, the mean level of the input frame is determined as 'the sum of the channel levels for which $C_i=1$' divided by 'the number of channels for which $C_i=1$'. This is illustrated in block 54. Block 56 illustrates the parallel normalization for the word template frame level. This special mean level determination is important because in the instance where the input frame level exceeds the buffer level at only a few channels, then the remaining channels should not significantly weigh the resulting normalization level. If they did significantly weigh the resulting level, then the normalization process would be affected by the background noise rather than depending only on the speech energy.

In FIG. 5b, block 36 is shown expanded into blocks 60 through 76. To assign an appropriate value at each channel, two measurements are made. The first measurement is the difference between the normalized word template frame level and the normalized input frame level. This difference is denoted 'T', as seen in block 62.

The absolute value of T becomes the value assigned at the particular channel if $C_i=1$ for that channel, i.e. if the input frame level is greater than the buffer level. The $C_i$ test is illustrated in block 64 and the absolute value of T is shown accumulated into the distance score, DIST, in block 66.

The second measurement tests if T is greater than zero, block 68, only for those channels where the buffer level is greater than the input frame level, i.e. where $C_i=0$. By comparing T to zero in this instance, block 68, the word template frame level can be detected beneath the buffer level. This is because at this point the input frame level is known to be below the buffer level, since $C_i=0$. Hence, if the word template level is below the input frame level, then it follows that the word template frame is below the buffer level. This is important because if both levels are below the buffer level, no true level comparison can be made. Therefore, the expected value 'e' is assigned. The total distance score is shown accumulating 'e' in block 70.

If the word template frame level is not detected below the buffer level (T>0), then it is conceivable that a somewhat accurate measurement can be made between this level and the input frame level which is somewhere below the buffer level. If this measurement is not greater than a preselected nominal differential, then this differential becomes the assigned value at the channel. Although this value may differ depending on the application, it is preferred that the value be the value, 'e'. If the measurement is greater than the differential, then the value of 'T' becomes the value assigned to the channel. This is illustrated in block 72, with the greater of either 'e' or the value of 'T' accumulated into the total distance score, DIST. This value assignment process and accumulation is done at each channel as indicated by blocks 70, 74 and 76. These accumulated values become the total distance score, DIST, representing an accurate distance measure between a frame from a spoken word and a frame from a potentially matching word template.

It should be noted that the buffer differential, d, and the predetermined expected channel value, e, may be different for different channels. In addition, the above described technique can be modified to work with Euclidean or weighted Euclidean distance measures by making appropriate changes to blocks 66 and 72.

Although this method may be applied to any speech recognition system which uses channel bank type information in representing the speech utterances, a problem arises when this method is used with a truncated searching technique. A truncated searching technique, such as Beam Decoding, only extends decoding paths whose accumulated distance is within a threshold of the accumulated distance for the best current path. This searching strategy reduces searching time and is well known in the art. Reference B. Lowerre, "The Harpy Speech Recognition System Ph.D. Dissertation, Computer science Dept., Carnegie-Mellon University, 1977.

The problem that arises, when using this method with a truncated search, pertains to energy levels in the input frame which are close to the background noise energy levels. This is indicated by a majority of the channels having $C_i=0$. When such an input frame is compared to a number of word template frames, each resulting total distance score will be very similar. This does not effect a distinguishing distance measure between the frames. In this instance, the searching is no longer truncated since all the distance scores will be less than the threshold. Hence, no decoding path can be eliminated from exhaustive comparisons.

One solution to this problem, in accordance with the present invention, is referred to as "energy thresholding". Energy thresholding in this sense prohibits matching a high energy portion of a word template to relatively low input frame energies. If the energy of the input frame, preferably the average energy for all the channels, is only slightly greater than the energy of the background noise, then the input frame will be considered dissimilar to a word template frame if the word template frame's energy is about equal to the peak energy of the entire word template. This offers an additional similarity measure for the truncated search strategy. If the distance scores for each frame of the different word templates are not distinguishing, then energy thresholding can be used. This is because an input frame from a spoken word, with relatively low energy, cannot correspond to a matching word template frame, if the latter frame has relatively high energy.

The preferred energy threshold test is as follows:

If the average energy of the word template frammme is within 12 dB of the peak energy in the word template; and the average energy of the input frame is lesss than the "valley" plus 6 dB, then the word template frame does not correspond to the input frame.

The term "valley" is used to represent the last previously detected, minimum energy level of speech relative to the present frame. For further information regarding valley detectors, refernce may be made to U.S. Pat. No. 4,378,603.

By using the frame comparison method described in FIGS. 5a and 5b, in combination with "energy thresholding", this frame comparison method can be used in an unlimited number of word template searching techniques.

What is claimed is:

1. A method for comparing stored speech recognition templates which are framed into time segments and channelized into at least two channels which are frequency band-limited to an input signal which has been contaminated by high levels of noise and which is framed into a time segment and channelized into at least two channels which are frequency band-limited, comprising the steps of:

determining, from the input signal, a first noise level associated with a first of the at least two channels and a second noise level associated with a second one of the at least two channels;

adding a buffering level to each of said first and second noise levels to create respective first and second buffered noise levels;

determining, from the input signal, a first signal level associated with a first of the at least two channels and a second signal level associated with a second of the at least two channels;

normalizing the level of each said first and second signal levels to create, respectively, normalized first and second signal levels;

normalizing a first channel stored speech recognition template and normalizing a second channel stored speech recognition template to create, respectively, first and second normalized template signal levels, subtracting said normalized first signal level from said normalized first template signal level to determine a first difference and subtracting said normalized second signal level from said normalized second template signal level to determine a second difference; and generating a distance measure by at least adding together:
  (a) the absolute value of said first difference if said first signal level is greater than said first buffered noise level, or said first difference if said first signal level is less than said first buffered noise level and said first difference is a positive value, or a predetermined nominal differential value if said first signal level is less than said first buffered noise level and said first difference is a negative value; and
  (b) the absolute value of said second difference if said second signal level is greater than said second buffered noise level, or said second difference if said second signal level is less than said second buffered noise level and said second difference is a positive value, or a predetermined nominal differential value if said second signal level is less than said second buffered noise level and said second difference is a negative value.

2. A method in accordance with the method of claim 1 wherein said step of generating a distance measure further comprises the steps of:
  assigning a first binary value to a storage means associated with said first channel if said first signal level is greater than said first buffered noise level;
  assigning a second binary value to said storage means associated with said first channel if said first signal level is less than said first buffered noise level;
  if said first channel has an associated first binary assigned storage value, summing the absolute value of said first difference into said distance measure in response to said positive value determination; and
  if said first channel has an associated second binary assigned storage value, determining if said first difference is a positive value and adding said first difference to said distance measure; and
  if said first channel has an associated second binary assigned storage value, determining if said first difference is a negative value and adding a predetermined nominal differential value to said distance measure in response to said negative value determination.

3. A method in accordance with the method of claim 1 wherein said step of generating a distance measure further comprises the steps of:
  determining whether both said first and second signal levels exceed a predetermined threshold level and inhibiting said generating step if both said first and second signal levels do not exceed said predetermined threshold level.

4. A word recognition detector which compares stored speech recognition templates which are framed into time segments and channelized into at least two channels which are frequency band-limited to an input signal which has been contaminated by high levels of noise and which is framed into a time segment and channelized into at least two channels which are frequency band-limited, the word recognition detector comprising:
  means for determining, from the input signal, a first noise level associated with a first of the at least two channels and a second noise level associated with a second one of the at least two channels;
  means for adding a buffering level to each of said first and second noise levels to create respectively first and second buffered noise levels;
  means for determining, from the input signal, a first signal level associated with a first of the at least two channels and a second signal level associated with a second of the at least two channels;
  means for normalizing the level of each said first and second signal levels to create, respectively, normalized first and second signal levels;
  means for normalizing a first channel stored recognition template and means for normalizing a second channel stored speech recognition template to create, respectively, first and second normalized template signal levels;
  means for subtracting said normalized first signal level from said normalized first template signal level to determine a first difference and means for subtracting said normalized second signal level from said normalized second template signal level to determine a second difference; and
  means for generating a distance measure by adding together at least a first and a second addend, further comprising:
    (a) means for selecting a first addend as the absolute value of said first difference if said first signal level is greater than said first buffered noise level, or as said first difference if said first signal level is less than said first buffered noise level and if said first difference is a positive value, or as a predetermmined nominal differential value if said first signal level is less than said first buffered noise level and if said first difference is a negative value; and
    (b) means for selecting a second addend as the absolute value of said second difference if said second signal level is greater than said second buffered noise level, or as said second difference if said second signal level is less than said second buffered noise level and if said second difference is a positive value, or as a predetermined nominal differential value if said second signal level is less than said second buffered noise level and if said second difference is a negative value.

5. A word recognition detector is accordance with claim 4 wherein said means for generating a distance measure further comprises:
  means for assigning a first binary value to a storage means associated with said first channel if said first signal level is greater than said first buffered noise level;
  means for assigning a second binary value to said storage means associated with said first channel if said first signal level is less than said first buffered noise level;
  means for summing the absolute value of said first difference into said distance measure if said first channel has an associated first binary assigned storage value;
  means for determining whether said first difference is a positive value and, in response to said positive value determination, for adding said first difference to said distance measure if said first channel has an associated second binary assigned storage value; and
  means for determining whether said first difference is a negative value and, in response to said negative value determination, for adding a predetermined nominal differential value to said distance measure if said first channel has an associated second binary assigned storage value.

6. A word recognition detector in accordance with claim 4 wherein said means for generating a distance measure further comprises:
means for determining whether both said first and second signal levels exceed a predetermined threshold level and
means for inhibiting said means for generating if both said first and second signal levels do not exceed said predetermined threshold level.

* * * * *